TELEPHONE ANSWERING SYSTEM

Filed April 29, 1964

3 Sheets-Sheet 1

INVENTOR
V. R. DE STEFANO
BY William F. Simpson
ATTORNEY 3,341,663

TELEPHONE ANSWERING SYSTEM

Vincent R. De Stefano, Lincroft, N.J., assignor to Bell Telephone Laboratories, Incorporated, New York, N.Y., a corporation of New York Filed Apr. 29, 1964, Ser. No. 363,359
12 Claims. (Cl. 179—27)

ABSTRACT OF THE DISCLOSURE

In a telephone answering system, subscriber lines are extended to consoles of an answering bureau where individual manual switches are effective to condition each line to indicate a called condition only in response to a specified number of cycles of applied ringing current. The ringing current cycles are counted by charging a capacitor during the first such cycle and then successively transferring the charge to subsequent capacitors, each such transfer occurring during a successive ringing current cycle.

Figures 1, 2:
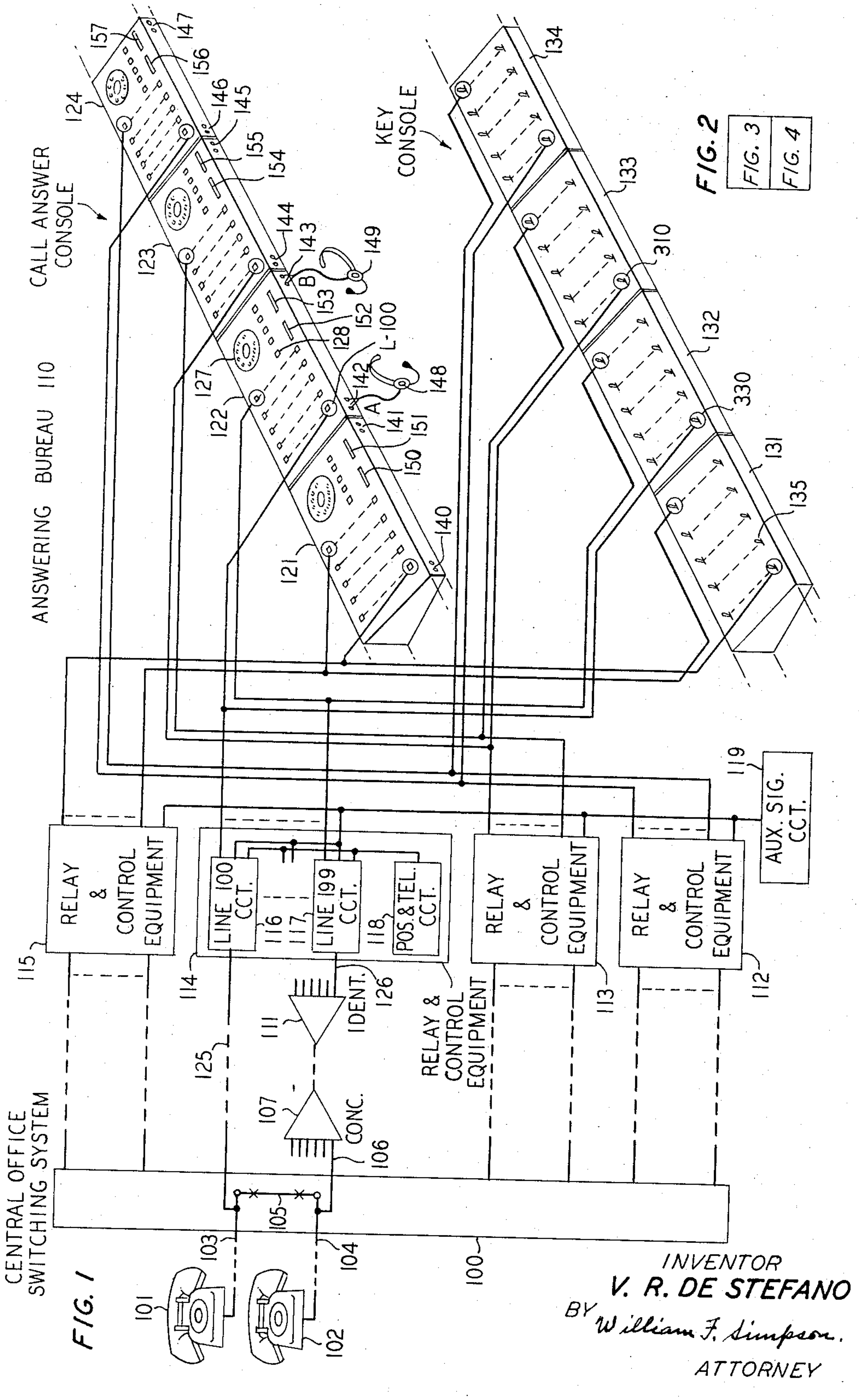

This invention relates to answering arrangements for telephone systems and more particularly to calling signal arrangements for telephone answering systems.

To enable people who do not answer their telephones nevertheless to receive messages from calling parties, there are provided telephone answering service bureaus. At these bureaus a subscriber's telephone line has an appearance so that an attendant, if the subscriber does not answer his line at his premises or office, can answer the call and take any message.

If the subscriber is at his office and prepared to answer the incoming calls himself, then the service bureau attendant need not answer. In such instances it may be unnecessarily distracting to the attendant to be signaled that a call, which she is instructed not to answer, is present on a subscriber's line. At other times, the subscriber may desire that he answer his own telephone unless he is occupied at his office, in which case the attendant at the answer service bureau should answer. This may be indicated to the attendant by a predetermined number of rings occurring before she answers.

Previously, it was necessary for the attendant or secretary to observe a lamp individual to each subscriber and note the number of times this lamp lights, and thus the number of rings applied to the subscriber's line, in order to determine when to answer the line.

While a secretary responsible for only a single subscriber's line may be able to recall the particular requirements of a subscriber at a particular time, the possible varying requirements of a number of different subscribers become very confusing to an answering bureau attendant particularly as they differ from line to line and, even for a single subscriber, from hour to hour.

Thus various subscribers may wish this service to be varied from hour to hour during the day, sometimes wishing the signals to be ignored, other times wishing that the call be answered on the first ring, and still other times wishing that the answering bureau attendant delay answering for a predetermined number of rings, such as three. Further, these different requirements may all be present at the same time on lines before the attendant, one line having one requirement and another line a different one, and the attendant must, in prior arrangements, keep track of which line at which time has which requirement.

An object of my invention is to provide a signal to an attendant indicating that a line is thereupon to be answered and that the special requirements of that line at that time have been automatically met.

It is another object of my invention to provide means for readily controlling the lighting of a lamp at an answering position or bureau to indicate that the attendant or secretary should answer the call upon the lighting of the lamp.

It is a further object of my invention to allow an attendant easily and expeditiously to set the particular requirements for answering a line at any particular time and unique to that line so that a signal to the attendant always implies that an immediate answer is required.

A feature of my invention relates to switching circuits which may be changed at will so that either the calls to a given subscriber will be ignored by the answering bureau or that the answering lamp will be lighted in response to the first ring or only after a predetermined number of rings have been applied to this subscriber's line, thus allowing the subscriber to answer the telephone himself if he wishes.

Another features of my invention relates to a novel circuit responsive to the ringing signals applied to the subscriber's line, which circuit does not in any way affect or trip the ringing current applied to the line.

Another feature of my invention relates to an improved counting arrangement wherein charge is transferred from one condenser to another and then to another in response to successive ringing current signals applied to the subscriber's line.

Figure 3:
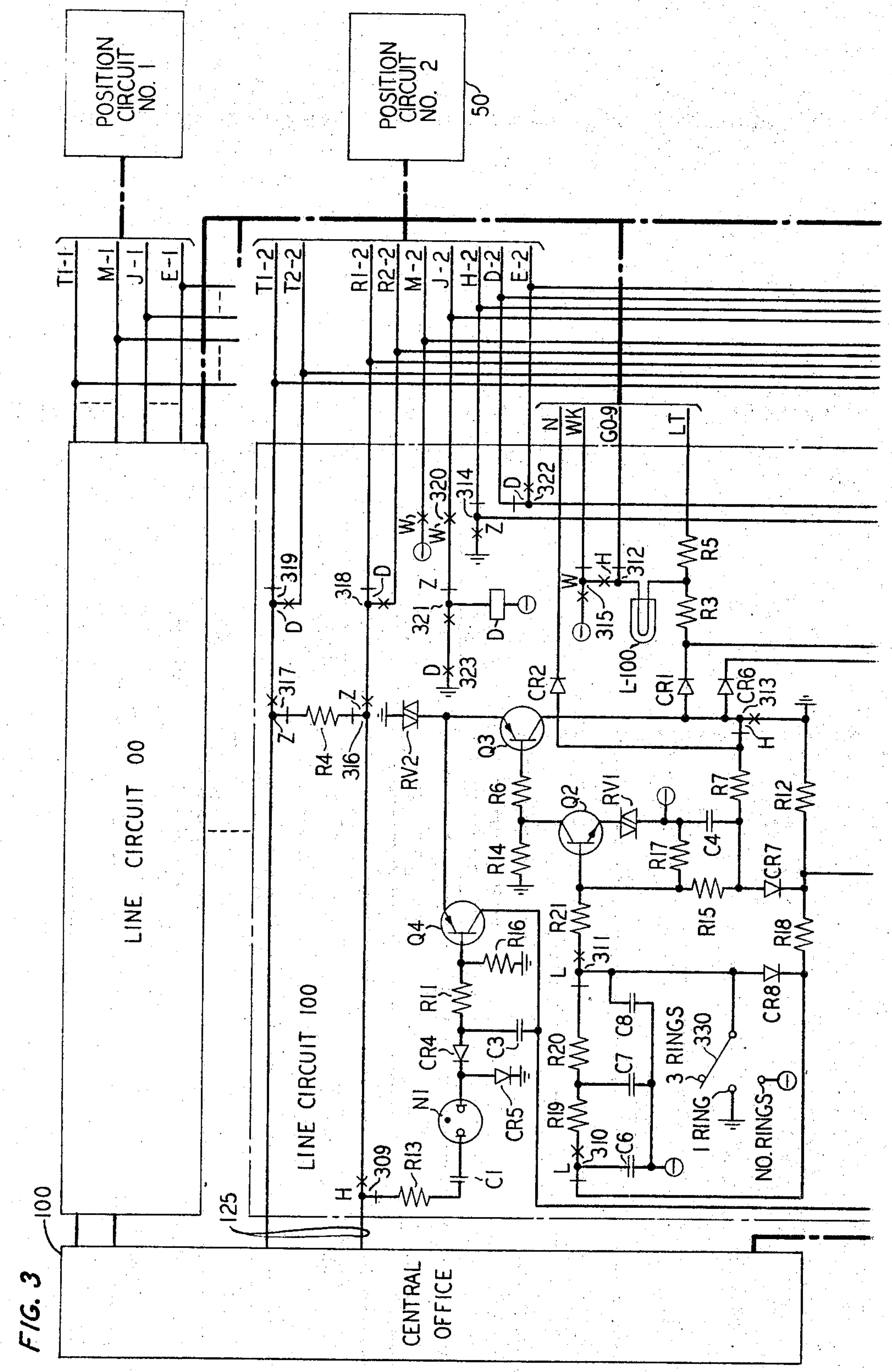
Figure 4:
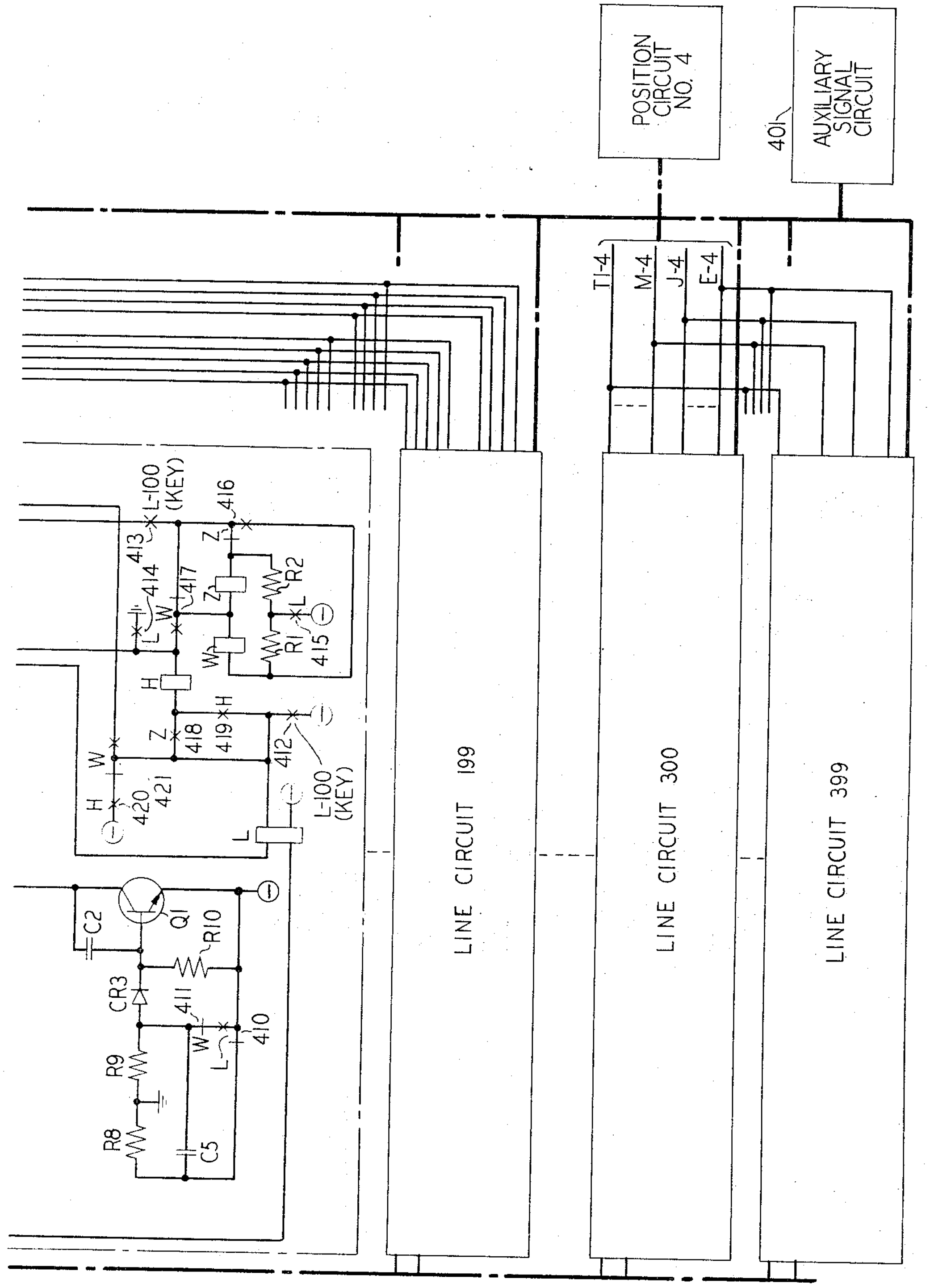

The foregoing and other objects and features of my invention may be more readily understood from the following description of an exemplary embodiment thereof when read with reference to the attached drawing, in which:

FIG. 1 shows the various components of an answering system, including the circuits and equipment at an exemplary answering bureau, and the manner in which these circuits and equipment are interconnected and cooperate with each other and with the central office system and the subscriber's lines;

FIG. 2 shows the manner in which FIGS. 3 and 4 are positioned adjacent one another; and FIGS. 3 and 4 show the circuit details, in accordance with one embodiment of my invention, of the individual line circuits at the answering bureau and the circuit responsive to the ringing applied to the subscriber's line as well as the circuits for counting the number of rings and energizing or lighting the subscriber's line lamp which indicates to that attendant at the answering bureau that a call should be answered.

Other novel features of the answering bureau shown and described but not claimed herein are claimed in the copending application of R. R. Leonard, Serial No. 363,-360 filed on the same date herewith.

While the exemplary embodiment of my invention described herein is arranged to cooperate with the circuits of a telephone answering bureau, it may equally well be arranged to cooperate with circuits of a PBX or of secretarial services or with circuits of services of other types where it may be desired to have calls answered by different persons at different times or under different conditions.

FIG. 1 shows the various component parts of an exemplary answering system embodying my invention.

The answering bureau 110 comprises four consoles 121, 122, 123, and 124. The answering bureau 110 also includes a corresponding number of key consoles 131, 132, 133, and 134. The number of these consoles may be extended in either direction from the four shown in FIG. 1. Each of these consoles in the exemplary embodiment of my invention is arranged to provide for or permit the answering of a hundred different lines and each of the lines to be answered is provided with a combined line lamp and line key designated L–100 for line 125. Each of the answering consoles also has a corresponding key console in which a key is provided for each of the lines to be answered.

The key provided for each line is arranged to be operated in any one of three positions and to remain in any one of these positions until moved to another one of these positions. In one position of this key the equipment at the answering bureau does not respond to calls directed to the subscriber's lines served by the answering bureau. In another position the circuits are arranged so that the equipment at the answering bureau respond to the first ringing signal applied to the subscriber's lines. In the third position of the key the circuits at the answering bureau do not signal the attendant to answer the call until the third ringing signal has been applied to the subscriber's line.

The relay and control equipment 115 is provided for the first console 121 and the associated key console 131. The relay and control equipment 114 is provided for the second answering console 122 and the related key console 132. The relay and control equipment 113 is provided for the third answering console 123 and the key console 133. The relay and control equipment 112 is provided for the fourth call answer console 124 and the key console 134.

Each of the call answer consoles is provided with an A attendant's jack such as 140, 142, 144 and 146. Likewise, each of these consoles or positions is provided with a B attendant's jack 141, 143, 145 and 147.

As shown in FIG. 1 an attendant's headset 148 is connected with the A jack of the second console and an operator's headset 149 is shown connected with the B jack of the same console or position 122.

Each of the positions of consoles is provided with an A release key or bar 150, 152, 154 and 156 and with a B release key or bar 151, 153, 155 and 157. Each of the consoles is provided with a grouping and teaming key such as 128 and with a dial 127. When desired each of these console positions may also be provided with a card dialer or other automatic dialing arrangement to permit the attendant to make outgoing calls from the answering bureau.

The relay equipment 114 is shown in greater detail in FIG. 1 than is the relay equipment 112, 113 and 115. This relay equipment also includes the equipment such as shown in 114. This equipment includes a line circuit such as 116 and 117 for each of the individual lines to be answered by the answering bureau. This relay equipment also includes the position and operator's telephone circuits 118 and an auxiliary signaling circuit 119.

The answering bureau is interconnected with the central office switching system by a plurality of trunk or line circuits. These lines or trunk circuits may comprise a pair of wires for each subscriber line that is to be answered. The conductors 125 illustrate such a line or trunk circuit extending between the answering bureau and the central office. This pair of wires is interconnected with the subscriber's line 103 extending to the subscriber's station 101. This interconnection is usually at the central office 100 but need not be. The interconnection may be at any point along the subscriber's line.

Alternately, a subscriber's line such as 104 extending to the subscriber's station 102 may be connected by means of line 106 to concentrator 107 and this concentrator in turn interconnected by a small number of lines or trunks to identifier 111 near or at the answering bureau and the output from the identifier then connected to line circuit such as 117 at the answering bureau. Any of the connections for any of the lines to be answered may be provided by the individual trunk circuits such as 125 or they may be interconnected through a concentrator identifier such as illustrated by the conductors 106 and 126.

The central office is represented by the rectangle 100 in FIG. 1 and two representative subscriber's stations 101 and 102, which are to be provided with answering service, are interconnected with the central office by means of the subscriber's lines 103 and 104, respectively. These lines may be interconnected by means of the switching equipment represented by 105 in FIG. 1. This switching equipment may be of any suitable type including manual switching systems as well as automatic switching systems of any desired type.

In the specific embodiment of the invention described herein, it is assumed that this switching equipment is arranged to provide calling signals on the subscriber's line normally called ringing current and that this applied in cycles of two seconds of ringing current each one ring followed by four seconds of silent interval and then the above cycle repeated until the subscriber answers or the call is abandoned.

Details of a typical line circuit and the circuits responsive to ringing embodying my invention are shown in FIGS. 3 and 4 when arranged as shown in FIG. 2.

Assume now that an attendant has inserted her telephone into the attendant's jacks in the A position of the console 50 designated position circuit 2. The position circuits are described in greater detail in the above-identified patent application of R. R. Leonard. Also assume that the subscriber at station 101 receives a call which this subscriber does not answer. Also assume that in response to instructions given by him to the answering bureau the switch 330 is set in the 3 rings position so that the circuits at the answering bureau delay the signaling of the attendant until the beginning of the third ring or ringing signal applied to the subscriber's line 103. As described above, the line conductors 125 are interconnected with the subscriber's line conductors 103 and extend to the answering bureau in accordance with the exemplary embodiment of this invention described herein.

These conductors 125 may be extended directly to the subscriber's line conductors 103 or they may be connected through concentrating equipment both at the central office and at the answering bureau as described above. It is assumed that the conductors 125 extend directly to the line conductors 103 but as described above the system works equally well if concentrating equipment is interposed between the subscriber's line 103 and the line conductors 125.

Thus, when ringing current is applied to the subscriber's line 103 extending to the subscriber's station 101, ringing current is also transmitted over the line conductors 125 extending to the answering bureau.

It is assumed that this ringing current is applied to the ring conductor extending to the answering bureau. If the ringing current is applied to the tip conductor of the subscriber's line then the connections of the conductor 125 to the subscriber's line will be reversed so that the ring conductor at the answering bureau will be interconnected to the tip of the subscriber's line at the central office. As a result ringing current will be transmitted through the break contact 309 of the H relay and then through the resistor R13 and capacitor C1 to the neon lamp or tube N1. The voltage applied to this neon lamp by the ringing current is of sufficient magnitude to ionize the gas within the tube with the result that current flows through this tube and then through the rectifying circuits comprising the diodes CR4 and CR5. As a result, the condenser C3 will be charged by this rectified current. The voltage on the condenser C3 is then transmitted through the resistor R11 to the base of the transistor Q4. The impedance of the above circuit from contacts 309 of relay H is sufficiently high so that the ringing current applied to the subscriber's line at the central office 100 is not tripped, interrupted, or otherwise affected.

Q4 is normally turned off but the application of the voltage from the rectifying diode CR4 causes this transistor to be turned on and in turn operates relay L due to current flowing through its upper winding from battery to the collector of the transistor Q4.

In the exemplary embodiment of this invention described herein it is assumed that ringing current is applied to the subscriber's line for a period of approximately 2 seconds followed by a silent interval of approximately 4 seconds after which the above cycle is then repeated.

Of course, any other suitable ringing cycles may be employed. The L relay of FIG. 4 is thus operated in the manner described above during each two seconds ringing signal and releases during the following four seconds silent interval.

Transistor Q1 of FIG. 4 is normally biased so that it is conducting or turned on due to a voltage drop across resistor R10. The voltage drop across this resistor is due to current flowing from negative battery through resistor R10, diode CR3 and resistor R9 to ground. The voltage drop across resistor R10 is applied across the emitter junction of the transistor Q1 and causes this transistor to be turned on with the result that the collector of this transistor is at substantially the battery voltage which voltage also appears across the resistor R12. Under these circumstances transistors Q2 and Q3 of FIG. 3 are turned off or biased so that they are not conducting. The bias circuit for transistor Q2 extends through the diode CR7 and resistor R15 to the base of transistor Q2 which is thus held more negative than the emitter. The varistor RV1 connected between the emitter and negative battery provides sufficient voltage drop to insure that the transistor Q2 is turned off. With this transistor turned off no current flows through resistor R14 so that the transistor Q3 is likewise turned off due to the voltage across the varistor RV2. In addition with the L relay released the condenser C5 has negative battery voltage applied to its left-hand terminal and ground through resistor R9 to its right-hand terminal. Thus this condenser is charged to substantially full battery voltage.

In addition, negative voltage from the transistor collector Q1 is transmitted to the upper terminals of the condensers C6, C7 and C8 of FIG. 3 so that these condensers are substantially discharged because their lower terminals are also connected to negative battery.

When the L relay operates in the manner described above in response to the first ringing or call signal applied to the called subscriber's line the contacts 410 are actuated. As a result, negative battery is removed from the left-hand terminal of condenser C5 and applied to the right-hand terminal thereof through the break contacts 411 of relay W. As a result, the charge on the condenser C5 is reversed through resistor R8 and the right-hand terminal of this condenser becomes charged negatively with respect to the left-hand terminal.

The operation of contacts 410 in addition applies negative voltage through the contacts 411 and the diode CR3 to the base of the transistor Q1. As a result, this transistor is turned off and removes negative battery from the lower terminal of the diode CR7 and the junction of resistors R18 and R12.

At the end of the first ringing interval or call signal applied to the subscriber's line the ringing current is interrupted and the L relay thereupon releases.

The release of the L relay causes the contacts 410 to be restored whereupon negative battery voltage or potential is applied to the left-hand terminal of condenser C5. Since the right-hand terminal is charged now to substantially battery voltage and negative voltage is now connected to the left-hand terminal, the right-hand terminal now becomes negative to a value of substantially twice the battery voltage. This potential is applied through the diode CR3 to the base of transistor Q1 which tends to maintain the transistor Q1 turned off. This voltage also tends to discharge through the resistor R9. The time constant of this discharging circuit, however, is such that it requires a time interval appreciably longer than the interval between ringing signals to discharge condenser C5 to the voltage at which the transistor Q1 will be turned on.

The release of the L relay at this time also restores the contacts 310 to their initial condition whereupon the upper terminal of condenser C6 is connected through the resistors R18 and R12 to ground. Consequently, condenser C6 now becomes charged with the upper terminal at substantially ground potential and the lower terminal at negative battery voltage.

In response to the succeeding ringing signal or current the L relay will be reoperated in the manner described above and cause contacts 410 and 310 to be operated. The operation of the contacts 410 causes condenser C5 to be recharged to the battery voltage with negative potential applied to its right-hand terminal and ground to its left-hand terminal through resistor R8. In addition, the negative voltage through the contacts 410 is applied to the diode CR3 which in turn maintains the transistor Q1 turned off.

The operation of contacts 310 of the L relay at this time connect the upper terminal of condenser C6 through resistor R19 to the upper terminal of condenser C7. Consequently, condenser C7 receives a charge so that its upper terminal is no longer at the negative battery voltage. In other words, a portion of the charge on condenser C6 is transferred to the condenser C7 at the beginning of this second ringing interval.

At the end of the second ringing interval the L relay will release again and cause the contacts 410, 310 and 311 to again be restored to their unoperated or initial conditions. As a result the transistor Q1 is maintained in its off state atnd condenser C5 again starts to discharge through the resistor R9. In addition the contacts 310 again connect the upper terminal of condenser C6 to ground through the resistors R18 and R12 thus again restoring the full charge on this condenser.

Release of the contacts 311 of the L relay which produced no effect prior to this time now interconnect the upper terminal condenser C7 through resistor R20 to the upper terminal of condenser C8, thus causing the transfer of a charge from the upper terminal of condenser C7 to the condenser C8. As a result the voltage or potentiol of the upper terminal of condenser C8 changes from negative battery voltage to a voltage closer to ground potential.

At the beginning of the third ringing interval the L relay will again reoperate and close the contacts 410, 310 and 311 in the manner described above. The operation of the contacts 410 again maintain the transistor Q1 in the turned off state and cause condenser C5 to be recharged in the manner described above. The operation of contacts 310 also cause a portion of the charge on condenser C6 to be transferred to condenser C7 in the manner described above.

The operation of contacts 311 at this time connect the upper terminal of condenser C8 through the resistor R21 to the base of the transistor Q2. As a result, the transistor Q2 is now biased to an on condition since current will now flow to the base and through the emitter junction of this transistor and through the varistor RV1 to negative battery. With transistor Q2 conducting current will flow from ground through the resistor R14 and the collector-emitter junctions of transistor Q2 to negative battery through the varistor RV1. The voltage drop across resistor R14 is applied through resistor R6 to the base of the transistor Q3 which causes the emitter junction of the transistor Q3 to be forward biased thus turning "On" this transistor and causing current to flow from ground through the varistor VR2, the emitter and collector junctions of transistor Q3, the diode CR1 and resistor R3 and lamp L–100, the normal contacts 312 of the H relay over the GO–9 conductor to the auxiliary signal circuit and then to negative battery through an interrupter. Consequently, lamp L–100 flashes and indicates that a call is to be answered. A circuit is also completed from the collector of transistor Q3 through the norman contacts 313 of the H relay and diode CR2 over the N conductor to an auxiliary signal circuit which operates to actuate visual or audible signals to attract the attendant's attention.

The collector of the transistor Q3 is also connected through the break contacts 313 of the H relay and resistor R7 and resistor R15 to the base of the transistor Q2. With the transistor Q3 turned on the collector is relatively close to ground voltage and this voltage is fed back through the resistors R7 and R15 to the base of the transistor Q2 to maintain this transistor in an on or conducting condition independently of the continued operation of the L relay. Thus if the attendant does not respond to the lamp signal L–100 before the end of the third ringing interval when the L relay releases the transistors Q2 and Q3 nevertheless remain conducting and the lamp L–100 continues to flash in response to the interrupted voltage applied to the GO–9 lead and the audible signal remains on in the auxiliary signaling circuit.

The attendant in responding to the line lamp L–100 will momentarily operate the nonlocking line key L-100 which in turn causes contacts 412 and 413 to close, it being recalled that this is a combined line-key and line-lamp device.

If the line relay L is operated at this time then the closure of contacts 412 produce no useful result. If on the other hand, relay L is released when the attendant operates the line key, contacts 412 complete a circuit for the operation of the L relay from battery through the operated contacts 412, the lower winding of this relay and then through the CR6 diode to the collector of the transistor Q3, through this transistor and the varistor VR2 to ground. With contacts 415 of the L relay closed and contacts 413 of the line key L–100 closed a circuit is completed for the operation of the W relay. This circuit extends from battery through the operated contacts 415 on the L relay, the R1 resistor, the winding of the W relay, the normal contacts 417 of the W relay, the closed contacts 413 of the line key, the normal contacts 314 of the Z relay and then over the H2 conductor to ground in the second position circuit 50.

The Z relay does not operate at this time because ground is connected to both of its winding terminals. The ground from the position circuit over the H2 lead as described above extends through the contacts 314, the key contacts 413, the normal contacts 416 of the Z relay to the right-hand terminal of the winding of the Z relay. This same ground also extends through the key contacts 413 and the normal contacts 417 of the W relay to the left-hand terminal of the Z relay, thus preventing this relay from operating.

The operation of the W relay causes contacts 417 to operate which contacts complete a holding circuit for the W relay from ground through the L relay contacts 414 and the operated contacts 417 of the W relay to the right-hand winding of relay W and then through this winding and the resistor R1 to negative battery through the operated contacts 415 of the L relay.

Ground is also connected through the operated contacts 414 of the L relay and the operated contacts of the W relay 417 to the left-hand winding terminal of the Z relay, thus preventing this relay from operating.

The operation of the W relay also completes a circuit for holding the L relay operated from battery over the D–2 conductor from the position circuit, the normal contacts 322 of the D relay and the operated contacts 421 of the W relay to the right-hand winding terminal of the lower winding of the L relay, thus maintaining this relay operated independently of the operation of the line key contacts 412.

The operation of the W relay also opens contacts 411 thus removing battery through the operated contacts of the L relay from the right-hand terminal of the condenser C5 thus allowing this condenser to discharge. The discharge of the condenser will be through the resistors R8 and R9 at this time thus insuring that sufficient time is allowed for this condenser to be discharged at the completion of the answering of the call by the attendant.

When the attendant releases the line key L–100, contacts 413 open and remove ground from the right-hand winding terminal of the Z relay thus allowing this relay to operate in a circuit extending from battery through the operated contacts 415 of the L relay, resistor R2, the winding of the Z relay, the operated contacts 417 of the W relay and the operated contacts 414 of the L relay. The operation of the Z relay at this time causes contacts 418 to close and complete a circuit for the operation of the H relay from ground through the operated contacts 414 of the L relay, the winding of the H relay, the closed contacts 418 of the Z relay, the closed contacts 421 of the W relay, the normal contacts 322 of the D relay to negative battery over the D–2 conductor to the position circuit.

The H relay in operating completes a holding path through its operated contacts 419 which are in parallel with the operated contacts 418 of the Z relay.

The operation of the H relay causes contacts 313 to operate. The operation of these contacts interrupts the feedback circuit from the collector of transistor Q3 to the base of the transistor Q2 described above so that the Q2 transistor will be turned off. In addition, the operation of the contacts 313 connect ground to the collector of the Q3 transistor thus interrupting the current flowing through this transistor. However, this ground extends through the CR6 diode to the lower winding of the L relay thus maintaining this relay operated to negative battery through the operated contacts 421 of the W relay, the normal contacts 322 of the D relay and over conductor D–2 to the position circuit.

The operation of the contacts 313 of the H relay also interrupts the circuit extending to the CR2 diode and over the N lead to the audible signal in the auxiliary signal circuit 401.

The operation of the H relay causes the contacts 304 to operate which contacts disconnect the resistor R13 from the line circuit thus disconnecting the ringing control circuits described above. The contacts 311 also partially extend the line circuit to the contacts 316 of the Z relay.

The operation of the contacts 309 of the H relay together with the operation of the contacts 316 and 317 of the Z relay extend the tip and ring conductors 125 from the called line over the T1–2 and R1–2 conductors to the position circuit 50. This circuit will trip the ringing in the central office and to the called subscriber's station and extend the talking conductor to the attendant's headset, whereupon she may converse with the calling subscriber.

At the completion of the conversation with the calling party the attendant will operate the position release key. As a result, the above described holding circuits for the H and L relays of FIG. 4 are interrupted, releasing these relays. The release of the L relay interrupts the circuits of the W and Z relays which relays in turn release thus restoring the line circuit to its initial condition. The release of the Z relay interrupts the operated contacts 316 and 317 thus interrupting the talking circuit to the position 50, and in turn restoring the position circuits to their idle but active condition.

When it is desired to signal the attendant to answer the call upon the first ring of the called subscriber's line, the switch 330 will be set in its one ring or middle position as shown in FIG. 3. With switch 330 set in its middle position ground is connected to the upper terminal of the CR8 diode. Consequently, when the L relay operates in response to the first ring applied to the called subscriber's line, in the manner described above, contacts 311 are closed; as a result, ground is connected through the operated contacts 311 and resistor R21 to the base of transistor Q2 thus turning on this transistor. Q2 then turns on the transistor Q3 which causes the line lamp L–100 to flash in the manner described above and causes the auxiliary circuit 401 to attract the attendant's attention. Thereafter the circuits operate in substantially the same manner as described above.

At certain other times it may be desirable to prevent the circuits from responding to any of the ringing signals applied to the subscriber's line. The circuits will not respond to ringing signals applied to the subscriber's line when the switch 330 is moved to the no ring position or the lower position as shown in FIG. 3. With switch 330 in this position negative battery is connected to the upper terminal of the CR8 diode so that upon the operation of the L relay the closure of contacts 311 connects the negative battery to the base terminal of the transistor Q2 through the R21 resistor, thus insuring that the base to the emitter junction of this transistor will be biased to the off condition and prevent the operation of this transistor. With transistor Q2 held in the off or nonconducting condition the transistor Q3 will similarly be held in the normal or off condition and thus prevent the lighting or flashing of the line lamp L–100 even though the L relay operates in response to each ringing signal applied to the subscriber's line.

It is to be understood that the above-described arrangements are illustrative of the application of the principles of the invention. Numerous other arrangements may be devised by those skilled in the art without departing from the spirit and scope of the invention.

What is claimed is:

1. In a telephone system, in combination, apparatus responsive to cycles of ringing current applied to a telephone subscriber line, signal means, counting means comprising a plurality of capacitors, means responsive to a first cycle of ringing current applied to a telephone subscriber line to charge one of said capacitors, means responsive to succeeding cycles of ringing current applied to said telephone subscriber line to transfer a charge from said one capacitor to others of said capacitors in succession, and means responsive to a charge on one of said capacitors to actuate said signal means.

2. In a telephone answering system in combination, an answer signal means, means for counting ringing signals applied to a subscriber's line comprising a plurality of condensers, means responsive to a ringing signal for charging a first one of said condensers, means responsive to a succeeding ringing signal to transfer a charge from said first condenser to a second one of said condensers, further means for transferring a charge from said second condenser to a third one of said condensers, and means jointly responsive to said charge on said third condenser and a ringing signal to activate said answer signal means.

3. In combination a signaling circuit, a plurality of condensers, means for charging one of said condensers in response to one signal from said signaling circuit, means responsive to succeeding signals from said signaling circuit to transfer a charge from successive ones of said condensers to a succeeding condenser beginning with said one of said condensers; and indicating means jointly responsive to a change of charge on a predetermined one of said condensers and to a predetermined signal from said signaling circuit.

4. In combination, a signaling circuit in accordance with claim 3 characterized in that the signaling circuit comprises a communication subscriber's line and further characterized in that the signals received from the signaling circuit comprise ringing current.

5. In combination, a signaling circuit in accordance with claim 3 characterized in that a manual switch is interconnected with said condensers to control said indicating means.

6. In combination, a signaling circuit in accordance with claim 3 characterized in that means responsive to the termination of said one signal from said signaling circuit is interconnected with one of said condensers to change the charge thereon.

7. In combination, a signaling circuit, in accordance with claim 6 characterized in that means responsive to the beginning of a succeeding signal is interconnected with said one condenser and a second of said condensers to transfer a charge from said one condenser to said second condenser.

8. In combination, a signaling circuit in accordance with claim 7 characterized in that means responsive to termination of signals received from said signaling circuit is interconnected with said condensers to transfer a charge from said second condenser to a third one of said plurality of condensers.

9. In combination, a telephone switching system, subscribers' lines connected thereto, means for applying calling signals to said lines, a telephone answering bureau, means for extending connections from certain of said lines to said answering bureau, answer signal means individual to each of said certain of said lines at said answering bureau, and selectively controllable means at said answering bureau responsive to a predetermined number of said calling signals applied to one of said certain lines to actuate the answer signal means individual thereto and said last means comprising a plurality of condensers to which charges are successively transferred.

10. The combination in accordance with claim 9 wherein said selectively controllable means further comprises switching means for determining said predetermined number of said calling signals.

11. In combination in a telephone switching system having subscriber's lines connected thereto, means for applying calling signals to said lines, a telephone answering bureau for answering telephone calls, means for extending connections from certain of said subscriber's lines to said answering bureau, means at said answering bureau responsive to the individual calling signals applied to individual ones of said certain of said subscriber's lines, and counting means comprising a plurality of capacitors and means for transferring a portion of a single charge successively to said capacitors at said answering bureau interconnected with said certain of said lines for counting the individual calling signals applied to the individual ones of said certain of said lines.

12. In combination in a telephone switching system in accordance with claim 11 characterized in that delay means is interconnected with said means responsive to individual calling signals responsive to a series of said calling signals, and means controlled by said delay means for restoring said counting means.

References Cited

UNITED STATES PATENTS

| | | | |
|---|---|---|---|
| 2,892,038 | 6/1959 | Gatzert | 179—27.25 |
| 2,971,061 | 2/1961 | Judy | 179—27.25 |
| 2,985,721 | 5/1961 | Gatzert | 179—27.25 |
| 3,176,082 | 3/1965 | Nilsson | 179—18.03 |

KATHLEEN H. CLAFFY, *Primary Examiner.*

WILLIAM C. COOPER, *Examiner.*